United States Patent [19]

Blanco

[11] 4,185,448

[45] Jan. 29, 1980

[54] COMBINATION RAKE AND TRASH PICK-UP TOOL

[76] Inventor: Francisco Blanco, 501 NE. 69th St., Miami, Fla. 33138

[21] Appl. No.: 939,467

[22] Filed: Sep. 5, 1978

[51] Int. Cl.$^2$ ............................................. A01D 7/10
[52] U.S. Cl. .................................. 56/400.12; 294/50.9
[58] Field of Search ................... 294/19 R, 50.6, 50.8, 294/50.9, 51, 52, 104; 56/400.04, 400.11, 400.12, 400.17

[56] References Cited

U.S. PATENT DOCUMENTS

| | | | |
|---|---|---|---|
| 2,136,849 | 11/1938 | Hembree | 294/50.9 X |
| 2,891,374 | 6/1959 | Richmond | 56/400.12 |
| 3,643,410 | 2/1972 | Menning | 56/400.12 |
| 4,018,038 | 4/1977 | Sipe | 56/400.12 |
| 4,037,397 | 7/1977 | Fiorentino | 294/50.8 X |

FOREIGN PATENT DOCUMENTS 1438527   4/1966   France ................................. 56/400.12

*Primary Examiner*—Johnny D. Cherry
*Attorney, Agent, or Firm*—Ernest H. Schmidt

[57] ABSTRACT

A rake of the type having a fanned spring finger main raking head fixed at one end of a rake handle is provided with an auxiliary, complementary fanned spring finger rake head pivotally supported with respect to the rake handle and movable into clamping jaw-like relation with respect to the main raking head for picking up raked trash piles. The individual spring fingers of one rake head are receivable between the spring fingers of the other rake head to provide for raking with either rake head when they are held in relatively clamped together position.

1 Claim, 2 Drawing Figures

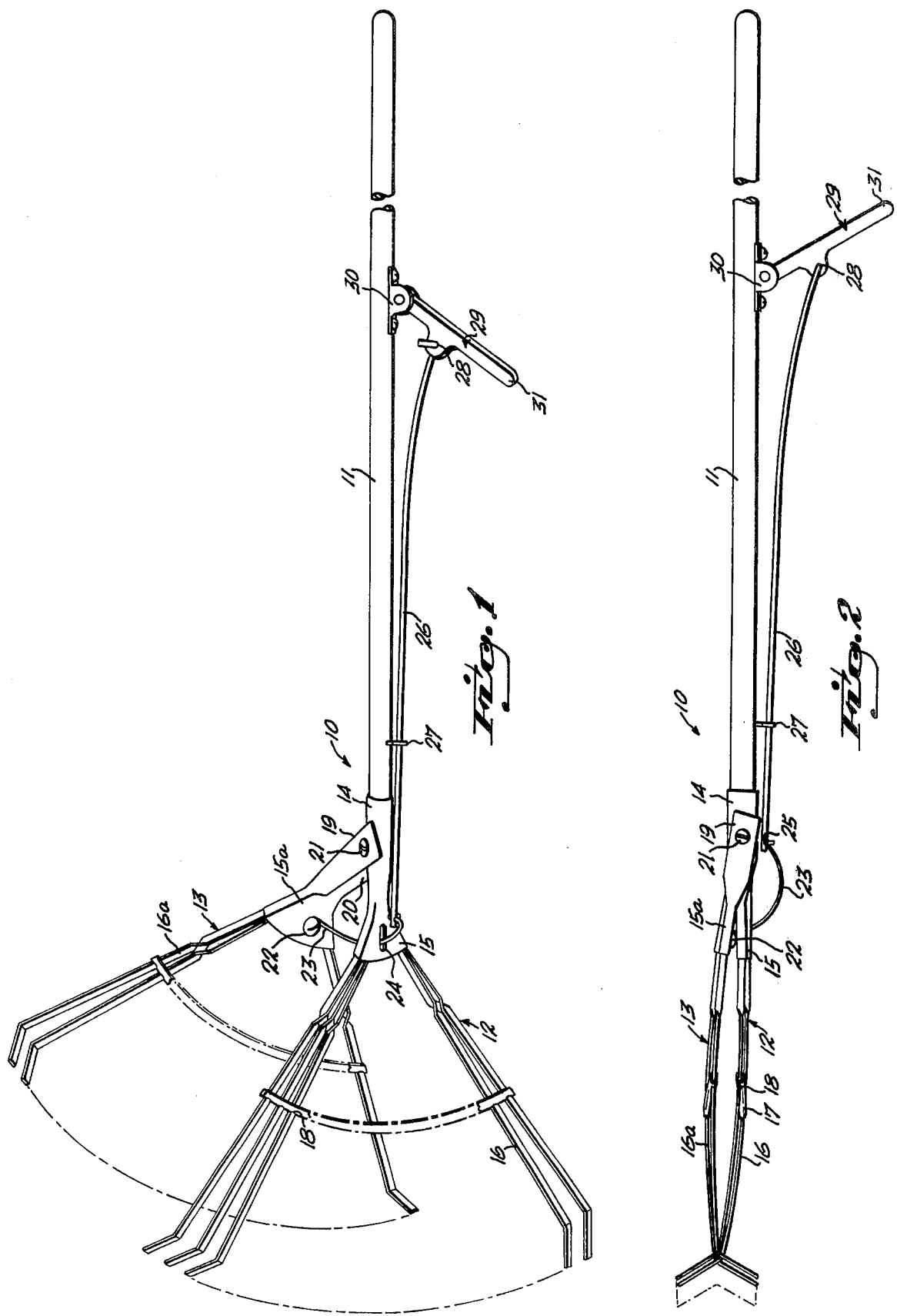

COMBINATION RAKE AND TRASH PICK-UP TOOL

This invention relates generally to lawn tools and is directed particularly to a novel and improved combination rake and trash pick-up tool. The use of rakes having fanned spring finger rake heads for light raking, such as raking together grass cuttings, tree leaves and the like, is known. In picking up such raked piles of cuttings, trash or debris, the rake head is commonly used together with the hand as an improvised scoop against which portions of the pile to be disposed of are picked up for disposal. This necessitates considerable bending on the part of the rake user, and is most inefficient because of the small amount of trash that can be held against the rake head in each pick-up operation. It is, accordingly, the principal object of this invention to provide a combination rake and trash pick-up tool that allows for automatically grasping and picking up comparatively large piles of trash without bending and with minimal effort.

A more particular object is to provide a combination rake and trash pick-up tool of the character described wherein an auxiliary fanned spring finger rake head is pivotally arranged with respect to the main fanned spring finger head and including remote controlled mechanism for its in and out jaw-like movement against the main rake head for clamping down upon and picking up raked piles of trash or debris to be disposed of.

Another object of the invention is to provide a combination rake and trash pick up tool of the character described wherein the relative movement of the auxiliary spring finger clamp head is manually controllable while grasping the rake handle in ordinary raking position, whereby trash pick up, as well as raking can be accomplished while in a standing position.

Another object of the invention is to provide a combination rake and trash pick up tool of the above nature wherein the individual spring fingers of one rake are receivable between the spring fingers of the other rake head to provide for raking with either rake head when they are held in relatively clamped together condition.

Other objects, features and advantages of the invention will be apparent from the following description when read with reference to the accompanying drawings. In the drawings, wherein like reference numerals denote corresponding parts throughout the several views:

FIG. 1 is an oblique view of the combination rake and trash pick-up tool shown in open position ready for closing upon a raked pile of trash for lifting and disposal; and FIG. 2 illustrates the tool in closed position, as used in raking.

Referring now in detail to the drawings, reference numeral 10 designates, generally, a preferred form of combination rake and pick-up tool comprising the invention, the same comprising an elongated cylindrical handle 11 carrying, at one end, a relatively fixed, fanned, spring finger rake head 12, and a pivotally supported auxiliary fanned spring finger rake head 13 facing said fixed head and operative to swing between open and closed positions respective thereto in the manner and for the purpose hereinafter more particularly described.

The fixed fanned spring rake head 12 comprises a tubular, tapered socket portion 14 within which the adjacent end of the handle 11 is interconnectingly received. The socket portion 14 can be fabricated of sheet metal, and is integrally formed as its outer end with a flattened, forwardly-extending and symmetrically divergent portion 15 within which the inner ends of the individual spring fingers 16 are securely clamped so as to radiate in fan-like fashion over an arc of about 45 circular degress. A bent sheet metal, arcuate brace 17 has equi-distantly spaced openings 18 along its length through which the spring fingers extend and are clamped for their retention flat-wise, in uniformly fanned apart relation. Other end portions of the spring fingers 16 are bent at an obtuse angle to provide resilient raking teeth upon use of the tool for raking, and to enhance trash pick-up action when used as a pick-up tool, as is hereinafter described.

The pivotally supported fanned spring finger rake head 13 differs principally from the fixed rake head 12 described above in that the divergent portion 15a which serves to clampingly support spring fingers 16a, instead of being integrally formed with a socket, is instead bifurcated to provide a pair of symmetrically opposed, substantially flat extension portions 19, 20 which straddle the tubular socket portion 14 of fixed rake head 12 and are swingably or pivotally secured thereto as by transversely-extending pivot pin or bolt 21. This construction permits the fixed and pivotally supported spring finger rake heads 12 and 13 to be moved relative to one another between open and closed positions, as illustrated in FIGS. 1 and 2, in mechanical jaw-like action. In this connection it is to be noted that the arcuate spacing between the rake head fingers 16 and 16a is the same, the rake heads being slightly arcuately offset relative to one another to that when the tool is in closed condition, as illustrated in FIG. 2, the spring fingers of one rake head will pass between the spring fingers of the other rake head without interference.

Remote control means is provided for moving the pivotally supported rake head 13 between open and closed positions with respect to the fixed rake head 12. To this end, the divergent spring finger clamp portion 15a of rake head 13 has secured thereto against the inside, as by bolt 22, one end of a length of spring wire 23 such as of stainless steel. The other end of the spring wire 23 extends through an opening 24 in divergent spring finger clamp portion 15 of fixed rake 12, and is pivotally connected in a transverse through opening 25 at the lower end of a control rod 26. The control rod 26 passes through an eyelet 27 fixed to the handle 11 for constraining said control rod to substantially longitudinal motion along the outside of said handle. The upper end of the control rod 26 is linked through an opening 28 formed between the ends of the control lever 29, one end of which is swingably journalled in a bracket 30 fixed to the handle 11 at a position approximately midway along its length, and the other end of which serves as a manual control handle 31.

In operation, it will be seen, with reference to FIG. 2, that when the control handle is rotated and held in the upward position, the spring wire 23 will have been pulled upwardly, causing the pivotally supported finger rake head 13 to close down tightly against the fixed rake head 12. In this position, since the relatively inwardly bent teeth of one of the rake heads pass between the teeth of the other rake head, as described above, either rake head can be used for raking leaves or other trash in the usual fashion without interference. In this connection it is to be noted that the control handle 31 is so positioned along the length of the rake handle 11 as to provide for holding the rake heads in closed condition while grasping the handle in ordinary raking position. It is to be understood, however, that auxiliary automatic locking means, not illustrated, could also be provided for maintaining rake heads in relatively closed position while raking.

Whenever it becomes necessary to pick up trash or debris, such as piles of leaves or grass cuttings or the like that have been raked together, it is only necessary to move the handle 31 downwardly to the open position as illustrated in FIG. 1 whereupon the open rake head "jaws" can be placed down upon the pile and the handle then moved upwardly for clamping the trash between the jaws for carrying to the point of disposal where release is simply effected by moving the control handle downwardly again.

While I have illustrated and described herein only one form in which my invention can conveniently be embodied in practice, it is to be understood that this form is presented by way of example only and not in a limiting sense. My invention, in brief, comprises all the embodiments and modifications coming within the scope and spirit of the following claims.

What I claim as new and desire to secure by Letters Patent is:

1. A combination rake and trash pick-up tool, comprising, in combination, an elongated rake handle, a main fanned spring finger rake head fixed at its apex and with respect to and extending outwardly of one end of said rake handle, a complementary auxiliary fanned spring finger rake head pivotally secured at its apex end with respect to said one end of said rake handle and movable between open and clamping jaw-like relation with respect to said main rake head for picking up trash piles, and remotely controllable means for moving said auxiliary fan spring finger rake head between said open and clamping positions, outer end portions of the individual spring fingers of each of said main and auxiliary rake heads being obtusely bent towards each other, said main and auxiliary rake heads being slightly laterally offset with respect to one another, whereby the individual spring fingers of one of said rake heads are receivable between the spring fingers of the other of said rake heads when said rake heads are in relatively clamping position, said remotely controllable means comprising an operating lever pivotally connected at one end to said rake handle at an intermediate position therealong, pivot means at an intermediate position along said operating lever, and elongated interconnecting means secured at one end to said auxiliary rake head and pivotally connected at its other end to said pivot means, said interconnecting means comprising a length of spring wire fixed at one end to said auxiliary rake head and extending through an opening in said main rake head, and a relatively rigid control rod, one end of said control rod being linked to the other end of said spring wire, and the other end thereof being pivotally connected to said pivot means.

* * * * *